UNITED STATES PATENT OFFICE 2,405,545

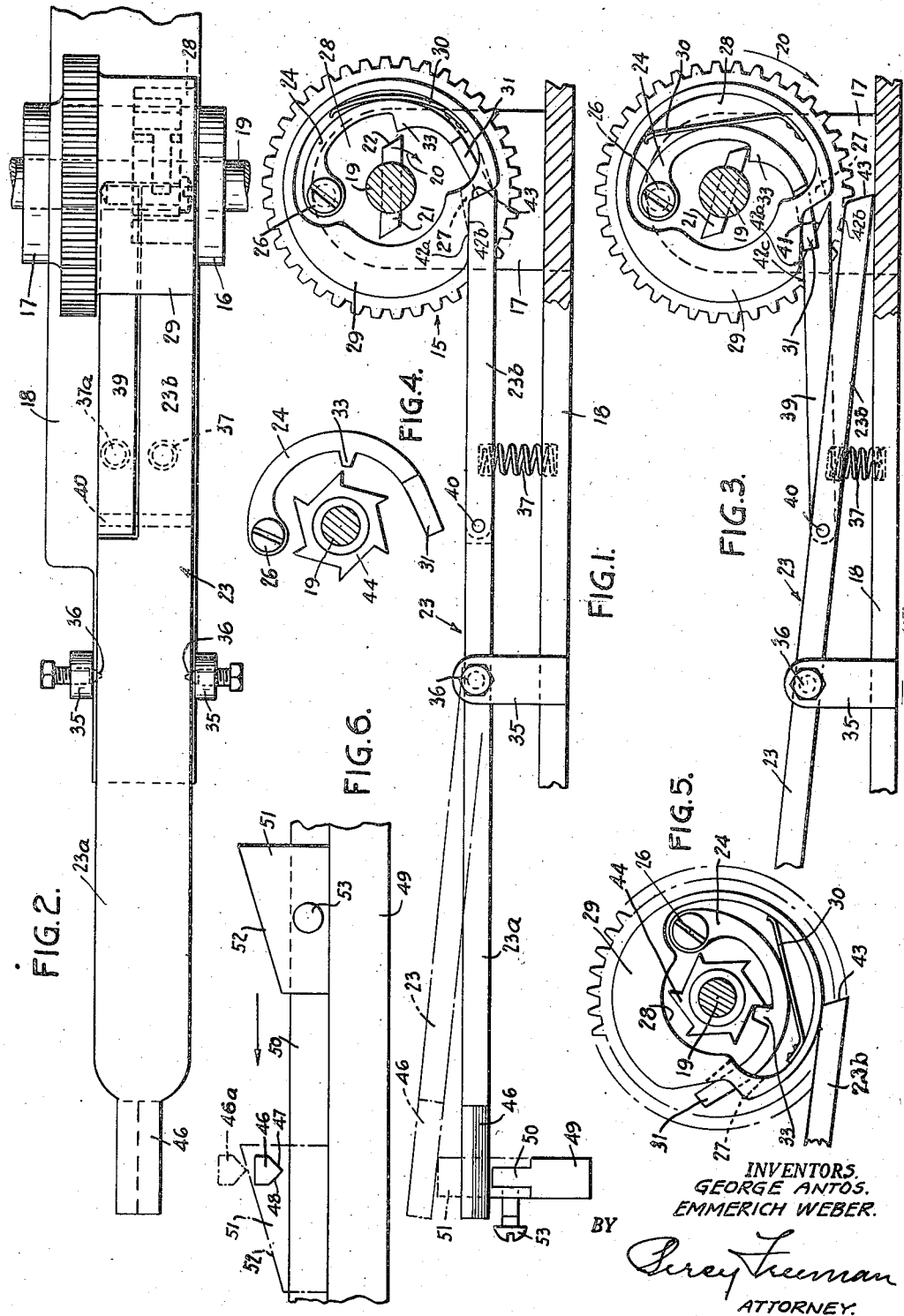

AUTOMATIC CLUTCH

George Antos and Emmerich Weber,
New York, N. Y.

Application November 15, 1943, Serial No. 510,264

4 Claims. (Cl. 192—28)

This invention relates to improvements in devices for engaging and disengaging a constantly revolving part, as a shaft, with a normally quiescent element, as a gear wheel or the like, in order to communicate rotary motion to it, to control other mechanisms, such devices being commonly called automatic clutches.

An object of the invention is to provide a clutch mechanism that is instant and positive in operation, both for engagement and release, its strength being limited only by that of the material used in its structure.

A further feature is in the provision of both automatic and manual means for clutching and unclutching the engaging elements, all of which are of simple construction, adapted for long continued service, and not subject to casual derangement.

Another purpose is to produce a clutch in which the driven element is prevented from over-running, being held against an abutment coincidentally with its release from the driver, and automatically stopped in an identical position at each release.

These several objects are accomplished by the novel and practical construction, combination and arrangement of parts hereinafter described, and illustrated in the annexed drawing, constituting a pictorial part of this disclosure, and in which:

Fig. 1 is a side elevational view of an embodiment of the invention, shown with its clutch in disengaged position.

Fig. 2 is a top plan view of the same.

Fig. 3 is a view similar to Fig. 1, but showing the clutch members as at the beginning of their operative engagement.

Fig. 4 is a side view of modified clutch engaging members, others being omitted.

Fig. 5 is a view similar to Fig. 4, but showing the clutch members in full engagement with a driven element.

Fig. 6 is an end view of Fig. 1 showing an adjustable automatic means to release the clutch members from engagement.

Referring in greater detail to the drawing, the clutch, generally designated by the numeral 15, is shown as mounted in bearings 16 and 17, carried on a base 18; in these bearings is a shaft 19 constantly rotating in the direction of the arrows 20, seen in Figs. 1 and 3.

A driver bar 21 is set rigidly in the shaft to protrude at one or both of its ends 22, which are bevelled and normally clear the adjacent parts of the mechanism, but may be caused to engage by raising the free end 23a of an arm 23.

A pawl 24 of arcuate shape, is pivoted at 26 within a recess 28 in the hub 29 of a gear or wheel to be driven, and is under the constant pressure of a leaf spring 30, riveted within the recess, the pawl having a reduced end extension 31, movable in an inclosed slot 27 in the hub of the gear.

The pawl 24 has, on its concave inner edge, an inreaching lug 33 adapted to be engaged by the one of ends of the bar 21, when the pawl is pressed by the spring 30, thereby causing rotation of the gear, which may be meshed with others as required in driving various mechanisms intermittently.

A pair of supports 35, fixed on the base 18, are provided with adjustable pivot screws 36 on which the arm 23 is mounted. The end of the arm, adjacent the gear hub 29, is reduced, as at 23b, alongside of which is a leaf 39 pivoted on a pin 40 in the arm 23. The arm element 23b and leaf 39 are normally raised by springs 37 and 31a respectively, seated in recesses in the base 18, so that the outer end 43 of the arm 23b abuts against the end 31 of pawl 24, thus maintaining its lug 33 out of the path of the driver bar 21, this being the normal condition.

When the end 23a of the arm is raised, either manually or as by the mechanism diagrammatically shown in Fig. 6, the end 43 of lever 23b will be depressed, out of the path of the pawl 24, thus permitting the pawl, under the effect of the spring 30, to enter the path of the driver bar 21 so that the bar engages the lug 33 to carry the gear around with it until the lug is released.

In the modified form shown in Figs. 4 and 5, the bar or pin 21 is omitted and for it is substituted a ratchet toothed star wheel 44 pinned or keyed to the shaft 19, all other elements remaining as previously described.

Should it be required to operate the clutch automatically the arm 23 may be provided at its outer end 23a with a narrow extension 46 having bevelled side edges 47 and 48, as shown in Figs. 1 and 2, and viewed also in Fig. 6.

A slide rail 49, provided with a tenon 50, is arranged to move transversely below the extension 46, and adjustably mounted on it are dogs 51 having raised angular faces 52.

These dogs may be held in adjusted position by clamp screws 53, and their angular faces inclined in either direction; obviously, upon contact of the faces with the extension 46, the arm 23a will be tilted upward on its trunnions and the clutch elements disengaged.

In engaging the clutch elements, let it be presumed the shaft 19 is constantly rotating, carrying either the driver bar 21 or star wheel 44 with it. As shown in Fig. 1, the arm element 23b has, near its outer bevelled terminal 43, a flattened upper surface 42b seated against a cam-like surface 42a in a lateral recess of the hub 29.

The extremity 43 of the arm abuts the tip of the reduced end 31 of the pawl 24, thereby positively preventing the pawl lug 33 from engaging the driver bar 21, and the "flat" 42a will be induced to come to rest against the flat surface 42b on the arm by reason of the pressure exerted by spring 37 thus assuring at all times, a return by the hub or casing 29 to its initial radial position.

Engagement ensues by raising the outer element 46, or adjacent part 23a of the arm, thereby tilting the opposite end 23b downwardly, clearing the surfaces 42b and 42a from contact and releasing the pawl end piece 31, allowing the pawl to move, under the urge of the spring 30, and the pawl lug 33 to engage the driver bar 21, or teeth of the wheel 44, thereby transmitting rotary motion to the gear through its hub.

However, the upper flat surface of the end of leaf 39 still maintains contact with the "flat" 42a to prevent rotation of the hub 29 until the pawl lug 33 has been engaged by the driver bar 21. Coincidently, the bevelled end 41 of the leaf 39 is pressed downwardly, against the pressure of the spring 37a, thereafter to ride on the surface of the hub 29, continuing to do so until the arm 23a has been shifted.

This can be done manually, or automatically by the device, shown best in Fig. 6, which can be adjusted to suit varying conditions. This device comprises a rail 50 fixed cross-wise below the outer end 46 of the tiltable arm 23; adjustably on the rail is mounted one or more dogs 51, of such length and inclination as may be best suited for their purpose, as for instance the length of time the lever arm is raised, and hence the number of revolutions of the gear before the end 43 of the lever again enters the path of the pawl 31. Attention is invited to the fact that stopping and starting are instantaneous, and that no possible slip or over-running can occur; furthermore, stopping is accomplished in such manner that the gear, and any connections made to it, are caused to cease rotation at one universal stopping point, a feature seldom, if ever attained by any known form of clutch.

While the foregoing is descriptive of an actual embodiment of the invention, it is to be regarded as suggestive, rather than prohibitive of other forms which the device may assume within the terms of the appended claims.

What is claimed as new and sought to secure by Letters Patent, is:

1. In an automatically operated clutch including a constantly rotating shaft and a member to be driven at intervals freely mounted thereon, a toothed element fixed on said shaft, a hub-like projection on said member, said projection containing a chambered recess and an indentation in its exterior, a pawl pivoted in the recess and having a part engageable with said toothed element, a spring urging the pawl into engagement, said pawl having its free end extending into the indentation, a spring-raised tiltable lever arm to intercept the pawl end when in a raised position thereby to displace the same from the toothed element, a leaf pivoted to said arm and normally spring-pressed against said hub-like projection to serve as a brake, and adjustable means for actuating said arm.

2. In a clutch for engaging a constantly rotating shaft with an encircling member, one or more aligned lateral projections on said shaft, a pawl pivoted in said member, a spring urging said pawl to engage the projections, said pawl having its free end extending outwardly beyond said member, a pivoted lever, a second spring to raise said lever into position to maintain the pawl normally out of contact with said projections, said lever being tiltable to release said pawl to permit it to be engaged by one of the projections, a leaf pivoted to the lever to ride over the surface of said member to serve as a brake, and means to control the movement of said lever and leaf.

3. In a clutch comprising a constantly rotating drive shaft having lateral projections and a chambered annulus therearound having a pawl pivoted therein spring urged to engage the projections, a pivoted lever having one end normally lying in the path of the pawl end to restrain it from engagement with the projections and to maintain said annulus quiescent, a leaf having a bevelled outer end to act at times as a brake on the surface of said annulus, and at other times having engagement with a "flat" on the annulus to restrain it from rotating after the restraining means has been moved from the path of the pawl end and until the pawl has engaged the projection, said lever coincidently acting as a positive stop, a transverse rail slidably mounted below the opposite end of said lever, and one or more dogs having angular faces adjustable on said rail to cause tilting of the lever at predetermined points.

4. In a clutch for engaging a constantly rotating shaft with an encircling member, one or more aligned lateral projections on said shaft, a pawl pivoted in said member, a spring urging said pawl to engage the projections, said pawl having its free end extending outwardly beyond said member, a pivoted lever, a second spring to raise said lever into position to maintain the pawl normally out of contact with said projections, said lever being tiltable to release said pawl to permit it to be engaged by one of the projections, and a leaf pivoted to the lever to ride over the surface of said member to serve as a brake.

GEORGE ANTOS.
EMMERICH WEBER.